(12) United States Patent
Feinman et al.

(10) Patent No.: US 12,204,693 B2
(45) Date of Patent: Jan. 21, 2025

(54) LOW-POWER HAND-TRACKING SYSTEM FOR WEARABLE DEVICE

(71) Applicant: Snap Inc., Santa Monica, CA (US)

(72) Inventors: Alex Feinman, San Mateo, CA (US); Ashwani Arya, Cypress, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/851,465

(22) Filed: Jun. 28, 2022

(65) Prior Publication Data

US 2023/0418385 A1 Dec. 28, 2023

(51) Int. Cl.
*G06F 3/01* (2006.01)
*G01S 13/08* (2006.01)

(52) U.S. Cl.
CPC .............. *G06F 3/017* (2013.01); *G01S 13/08* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 7,971,156 B2 | 6/2011 | Albertson et al. |
| 7,996,793 B2 | 8/2011 | Latta et al. |
| 8,487,938 B2 | 7/2013 | Latta et al. |
| 8,856,691 B2 | 10/2014 | Geisner et al. |
| 9,225,897 B1 | 12/2015 | Sehn et al. |
| 9,230,160 B1 | 1/2016 | Kanter |
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |

(Continued)

FOREIGN PATENT DOCUMENTS

| | | |
|---|---|---|
| CN | 103049761 | 8/2016 |
| EP | 3707693 | 9/2020 |

(Continued)

OTHER PUBLICATIONS

"International Application Serial No. PCT/US2023/069072, International Search Report mailed Oct. 13, 2023", 4 pgs.

(Continued)

*Primary Examiner* — Parul H Gupta
(74) *Attorney, Agent, or Firm* — Schwegman Lundberg & Woessner, P.A.

(57) ABSTRACT

A method for a low-power hand-tracking system is described. In one aspect, a method includes polling a proximity sensor of a wearable device to detect a proximity event, the wearable device includes a low-power processor and a high-power processor, in response to detecting the proximity event, operating a low-power hand-tracking application on the low-power processor based on proximity data from the proximity sensor, and ending an operation of the low-power hand-tracking application in response to at least one of: detecting and recognizing a gesture based on the proximity data, detecting without recognizing the gesture based on the proximity data, or detecting a lack of activity from the proximity sensor within a timeout period based on the proximity data.

20 Claims, 11 Drawing Sheets

(56) References Cited

U.S. PATENT DOCUMENTS

| | | | |
|---|---|---|---|
| 10,514,876 B2 | 12/2019 | Sehn | |
| 10,579,869 B1 | 3/2020 | Xiong et al. | |
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 2009/0012788 A1 | 1/2009 | Gilbert et al. | |
| 2011/0301934 A1 | 12/2011 | Tardif | |
| 2014/0059365 A1 | 2/2014 | Heo et al. | |
| 2014/0171036 A1 | 6/2014 | Simmons | |
| 2015/0049017 A1* | 2/2015 | Weber | G06F 21/36 345/156 |
| 2015/0120293 A1 | 4/2015 | Wohlert et al. | |
| 2015/0370320 A1 | 12/2015 | Connor | |
| 2017/0123487 A1 | 5/2017 | Hazra et al. | |
| 2017/0220119 A1* | 8/2017 | Potts | G06F 3/0346 |
| 2017/0277684 A1 | 9/2017 | Dharmarajan Mary | |
| 2017/0277685 A1 | 9/2017 | Takumi | |
| 2017/0351910 A1 | 12/2017 | Elwazer et al. | |
| 2018/0158370 A1 | 6/2018 | Pryor | |
| 2019/0094966 A1 | 3/2019 | Kulkarni et al. | |
| 2019/0146219 A1 | 5/2019 | Rodriguez, II | |
| 2021/0011612 A1 | 1/2021 | Dancie et al. | |
| 2021/0074016 A1 | 3/2021 | Li et al. | |
| 2021/0117660 A1* | 4/2021 | Risco | G06V 40/28 |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0188539 A1 | 6/2022 | Chan et al. | |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |

FOREIGN PATENT DOCUMENTS

| | | |
|---|---|---|
| EP | 4172726 A1 | 5/2023 |
| EP | 4172730 A1 | 5/2023 |
| KR | 20220158824 A | 12/2022 |
| WO | 2016168591 | 10/2016 |
| WO | 2019094618 | 5/2019 |
| WO | WO-2021021227 A1 | 2/2021 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022060549 A3 | 4/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

"International Application Serial No. PCT/US2023/069072, Written Opinion mailed Oct. 13, 2023", 7 pgs.

* cited by examiner

LOW-POWER HAND-TRACKING SYSTEM FOR WEARABLE DEVICE

TECHNICAL FIELD

The subject matter disclosed herein generally relates to a hand-tracking system. Specifically, the present disclosure addresses a low-power architecture hand-tracking system for wearable devices.

BACKGROUND

Augmented reality (AR) allows users to observe a scene while simultaneously seeing relevant virtual content that may be aligned to items, images, objects, or environments in the field of view of an AR device. The AR device includes a 6DOF (six degrees of freedom) tracking system that may require substantial power consumption. To conserve power, the AR device may be set to a sleep mode and awoken in response to a user requesting a start of an AR experience.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
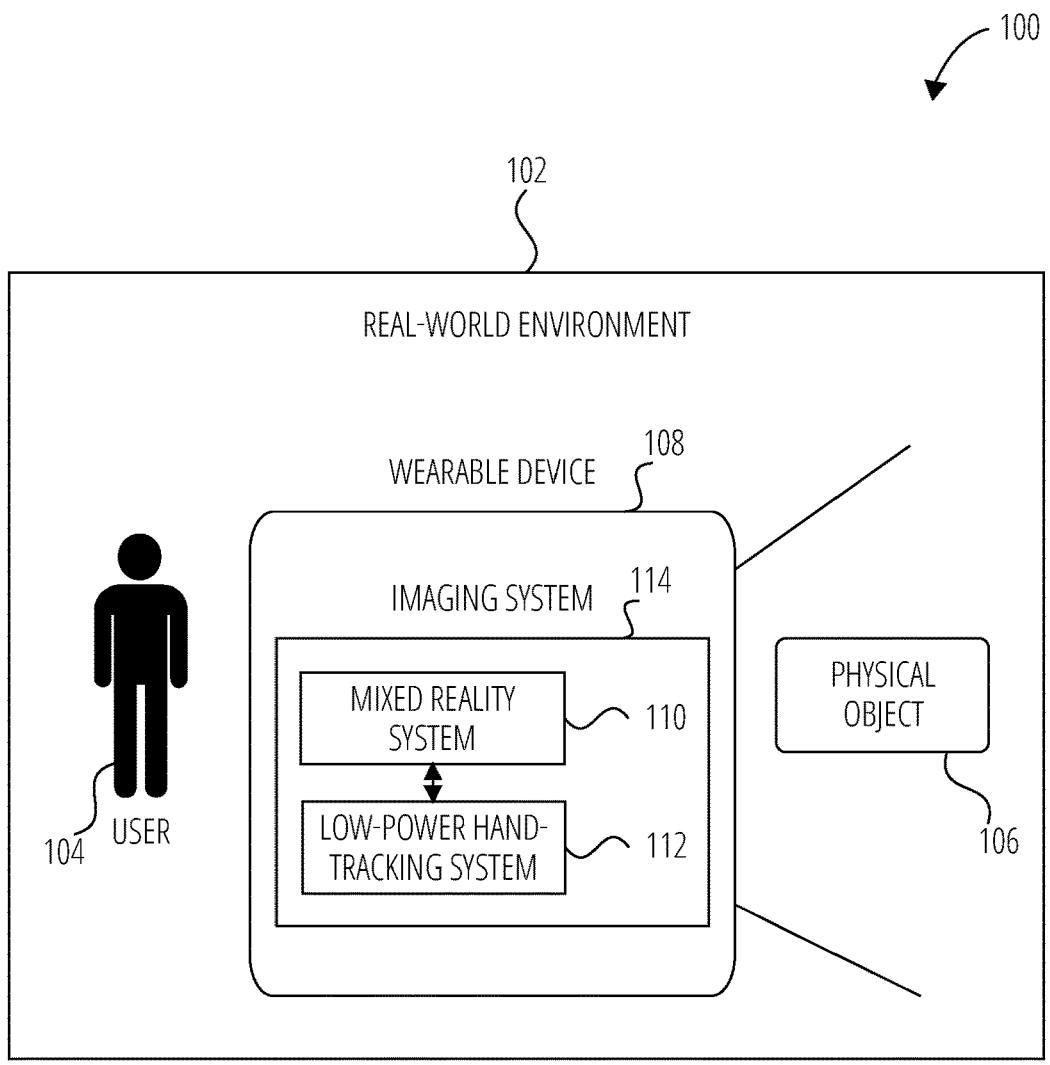
FIG. 1 is a block diagram illustrating an environment for operating an AR device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. VIO (also referred to as a visual-inertial tracking system, and visual odometry system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

Both AR and VR applications allow a user to access information, such as in the form of virtual content rendered in a display of an AR/VR display device (also referred to as "AR device", "VR device", and display device). The rendering of the virtual content may be based on a position of the display device relative to a physical object or relative to a frame of reference (external to the display device) so that the virtual content correctly appears in the display. For AR, the virtual content appears aligned with a physical object as perceived by the user and a camera of the AR display device. The virtual content appears to be attached to the physical world (e.g., a physical object of interest).

Displaying and aligning the virtual content within the physical world requires significant device computation power. In some examples, the AR device detects the physical object and tracks a pose of the AR device relative to a position of the physical object. A pose identifies a position and orientation of the display device relative to a frame of reference or relative to another object. The virtual content is therefore refreshed based on the latest pose of the device. The display device is also referred to as an imaging device that operates a mixed reality system (e.g., AR/VR application). The display device may be part of a wearable device (e.g., eye wear).

In order to improve the user experience for a user of the display device, the wearable device can operate in one of two modes: a low-power mode using a low-power processor (e.g., MCU) and a high-power mode using a high-power processor (e.g., SoC). In one example, the wearable device operates in a low-power hand-tracking application in the low-power mode on the MCU by accessing proximity data from a proximity sensor or range imaging sensor (e.g., Time-Of-Flight TOF sensor, structured light, interferometry). Traditional wearable device are controlled via touch or buttons. The present application describes a wearable device that detects and recognizes hand gestures in the low-power mode without using the SoC.

In one example, the wearable device consists of a low-power microcontroller capable of performing DSP-accelerated operations and a multi-cell proximity sensor or sensors attached to the wearable device. The microcontroller in turn is connected to the main SoC. In an idle state, the wearable device runs a low-frequency low-power poll on the proximity sensor in order to detect a hand proximity event. The low-power hand-tracking application determines whether the proximity event corresponds to an actual hand gesture. For example, a user bringing up a hand to scratch his/her forehead is not a gesture event. In response to detecting the proximity event, the wearable device switches from an idle mode (e.g., proximity sensor polling) into an active mode. In the active mode, the low-power hand-tracking application tracks hands and executes a gesture recognition routine. A cycle of the low-power hand-tracking application is completed when one of the following events is detected: (1) timeout with no gesture, (2) timeout with no hand activity, and (3) a gesture having been recognized. If a gesture has been recognized, the low-power hand-tracking application identifies an operation corresponding to the identified/recognized gesture. In one example, the low-power hand-tracking application identifies a gesture related to an operation of a mixed reality application that operates on the SoC. The low-power hand-tracking application communicates (and activates) the requested operation to the mixed reality application.

In one example, the estimated energy cost of operating proximity detection is about 1 mA·H. The low-power mode system includes a low-power microcontroller (MCU) with Digital Signal Processing (DSP) and optionally a neural network (NN) accelerator. The proximity sensor includes for example, a 4×4 or 8×8 cell proximity sensor connected to the low-power microcontroller using Serial Peripheral Interface (SPI) interface. The wearable device may include more than one proximity sensor. The low-power microcontroller includes a software library capable of (1) interpreting proximity data received from the proximity sensor and (2) performing hand detection and tracking. The output of such a software library may be an index from a gesture dictionary or an indicator (e.g., −1) if not recognized, and a confidence level.

In one example embodiment, the present application describes a method for hand-tracking using a low-power system of a wearable device. In one aspect, a method includes polling a proximity sensor of a wearable device to detect a proximity event, the wearable device includes a low-power processor and a high-power processor, in response to detecting the proximity event, operating a low-power hand-tracking application on the low-power processor based on proximity data from the proximity sensor, and ending an operation of the low-power hand-tracking application in response to at least one of: detecting and recognizing a gesture based on the proximity data, detecting without recognizing the gesture based on the proximity data, or detecting a lack of activity from the proximity sensor within a timeout period based on the proximity data.

As a result, one or more of the methodologies described herein facilitate solving the technical problem of power resource management of wearable devices. The presently described method provides an improvement to an operation of the functioning of a computer by reducing power consumption of a wearable device when the device is in an idle state (e.g., when the user is not enjoying an experience that requires 6DOF tracking). Using the techniques presented in this application results in substantial power savings. Limited experiences (e.g., gesture recognition) can be run on microcontrollers instead of high-power processors.

FIG. 1 is a network diagram illustrating an environment 100 suitable for operating a wearable device 108, according to some example embodiments. The environment 100 includes a user 104, a wearable device 108, and a physical object 106. A user 104 operates the wearable device 108. The user 104 may be a human user (e.g., a human being), a machine user (e.g., a computer configured by a software program to interact with the wearable device 108), or any suitable combination thereof (e.g., a human assisted by a machine or a machine supervised by a human). The user 104 is associated with the wearable device 108.

The wearable device 108 may be a computing device with a display such as a smartphone, a tablet computer, or a wearable computing device (e.g., watch or glasses). The computing device may be hand-held or may be removable mounted to a head of the user 104. In one example, the display includes a screen that displays images captured with a camera of the wearable device 108. In another example, the display of the device may be transparent such as in lenses of wearable computing glasses. In other examples, the display may be non-transparent, partially transparent, partially opaque. In yet other examples, the display may be wearable by the user 104 to cover the field of vision of the user 104.

The wearable device 108 includes an imaging system 114 that generates virtual content based on images detected with the camera of the wearable device 108. For example, the user 104 may point a camera of the wearable device 108 to capture an image of the physical object 106. The imaging system 114 generates virtual content corresponding to an identified object (e.g., physical object 106) in the image and presents the virtual content in a display of the wearable device 108. In another example, the imaging system 114 generates virtual content and presents the virtual content in a display of the wearable device 108 relative to a frame of reference (external to the display device) so that the virtual content correctly appears in the display In one example embodiment, the imaging system 114 includes a low-power hand-tracking system 112 and a mixed reality system 110. The low-power hand-tracking system 112 operates in a low-power mode using a low-power processor (e.g., MCU). The mixed reality system 110 operates in a high-power mode using a high-power processor (e.g., SoC). The terms "high-power" and "low-power" are used in relative terms: the low-power processor consumes less power than the high-power processor. Similarly, the imaging system 114 consumes more power when operating the mixed reality system 110 than when operating the low-power hand-tracking system 112.

The low-power hand-tracking system 112 operates in the low-power mode using a low-power processor and a proximity sensor. In one example, the low-power hand-tracking system 112 operates by default when the wearable device 108 is turned on. The low-power hand-tracking system 112 detects proximity activity using the proximity sensor. Examples of proximity activities include gestures or movement of the hands of the user 104 in front of the wearable device 108. The low-power hand-tracking system 112 is configured to identify a hand gesture based on proximity data from the proximity sensor. The low-power hand-tracking system 112 identifies an operation corresponding to the identified hand gesture and can either perform the operation locally (using the low-power processor) or request that the operation be performed by the SoC. The low-power hand-tracking system 112 is described in more detail below with respect to FIG. 4.

The imaging system 114 operates the mixed reality system 110 in the high-power mode using the high-power processor by accessing sensor data (e.g., data from any of the sensors in the wearable device 108). Non-limiting examples applications operating in the high-power mode include a 6DOF tracking system, a depth sensing system, an AR application (described in more detail below with respect to FIG. 3).

In one example, the imaging system 114 operates in a low-power mode using the low-power hand-tracking system 112 by default. The imaging system 114 detects a hand gesture that indicates a request to operate in the high-power mode (e.g., user starts an AR application on the wearable device 108) and in response switches to the high-power mode (e.g., activate a six-degrees of freedom (6DOF) tracking system instead of a current zero DOF tracking). In another example, the low-power hand-tracking system 112 fails to recognize hand gestures after a preset number of tries (e.g., after 3 times) and activates the high-power mode of the mixed reality system 110 in response to the pre-defined trigger event (e.g., failed to recognize a same or different hand gestures after 3 tries).

In one example, the imaging system 114 operates the mixed reality system 110 in the high-power mode with the SoC. In the high-power mode, the imaging system 114 activates additional sensors of the wearable device 108 and tracks the pose of the wearable device 108 relative to the real-world environment 102 using, for example, optical sensors (e.g., depth-enabled 3D camera, image camera), inertia sensors (e.g., gyroscope, accelerometer), wireless sensors (Bluetooth, Wi-Fi), GPS sensor, and audio sensor. In one example, the wearable device 108 displays virtual content based on the pose of the wearable device 108 relative to the real-world environment 102 and/or the physical object 106.

Any of the machines, databases, or devices shown in FIG. 1 may be implemented in a general-purpose computer modified (e.g., configured or programmed) by software to be a special-purpose computer to perform one or more of the functions described herein for that machine, database, or device. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The wearable device 108 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
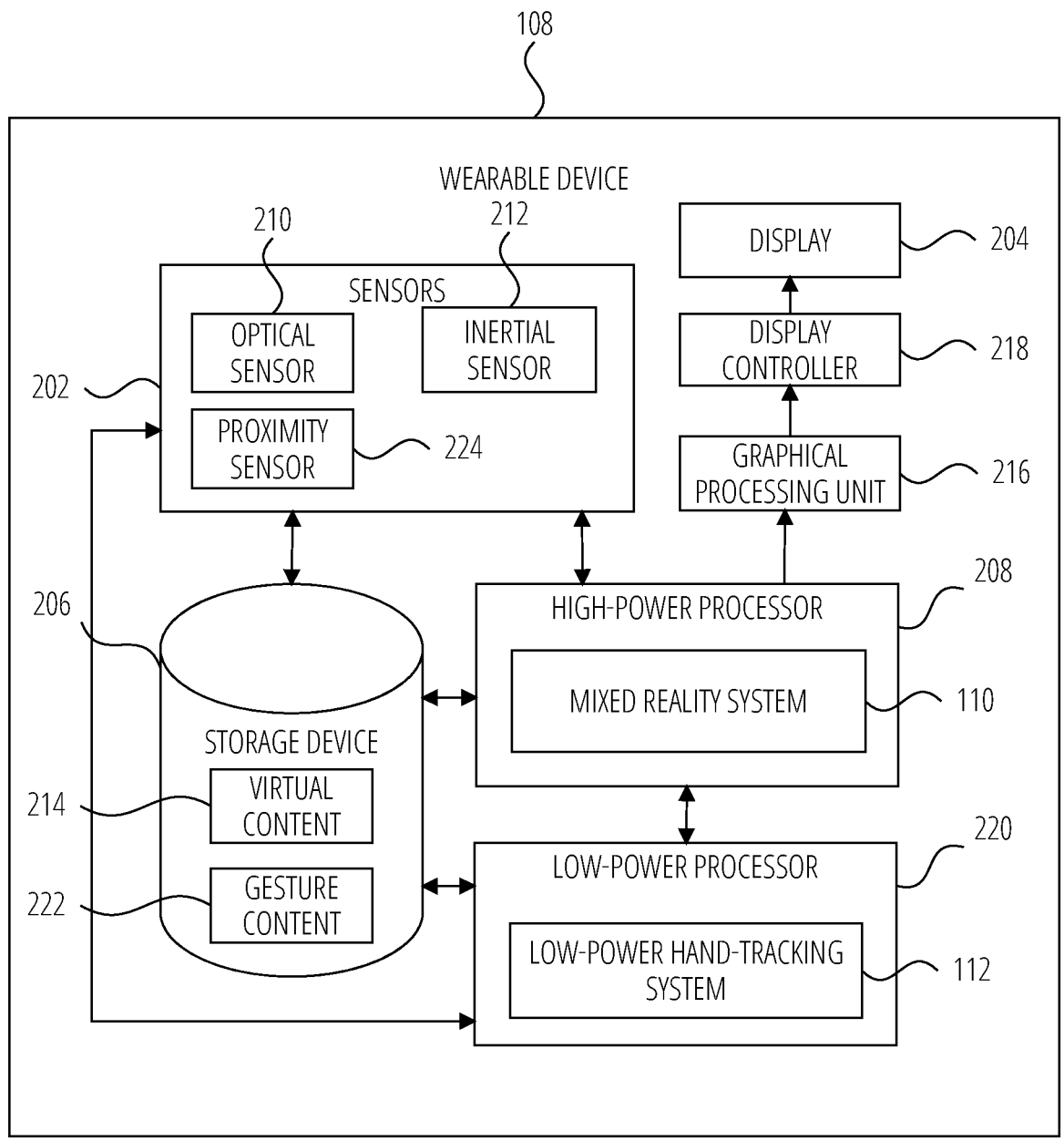
FIG. 2 is a block diagram illustrating an AR device in accordance with one example embodiment.

FIG. 2 is a block diagram illustrating modules (e.g., components) of the wearable device 108, according to some example embodiments. The wearable device 108 includes sensors 202, a display 204, a display controller 218, a graphical processing unit 216, a high-power processor 208, a low-power processor 220, and a storage device 206. Examples of wearable device 108 include a wearable computing device, a mobile computing device, a navigational device, a portable media device, or a smartphone.

The sensors 202 include, for example, an optical sensor 210 (e.g., camera such as a color camera, a thermal camera, a depth sensor and one or multiple grayscale, global/rolling shutter tracking cameras), an inertial sensor 212 (e.g., gyroscope, accelerometer), and a proximity sensor 224 (e.g., Time-Of-Flight TOF sensor, structured light, interferometry, and so forth). Other examples of sensors 202 include location sensor (e.g., near field communication, GPS, Bluetooth, Wifi), an audio sensor (e.g., a microphone), or any suitable combination thereof. It is noted that the sensors 202 described herein are for illustration purposes and the sensors 202 are thus not limited to the ones described above.

In one example, a proximity sensor 224 operates with the low-power hand-tracking system 112 (implemented using the low-power processor 220) while the remaining sensors (e.g., optical sensor 210, inertial sensor 212) operate with the mixed reality system 110 (implemented using the high-power processor 208). In another example, the high-power processor 208 can still operate the proximity sensor 224.

The low-power processor 220 includes the low-power hand-tracking system 112. The low-power hand-tracking system 112 accesses proximity data from the proximity sensor 224. An example of low-power hand-tracking system 112 is described in more detail below with respect to FIG. 4. The high-power processor 208 includes a mixed reality system 110. The mixed reality system 110 accesses sensor data from the sensors 202. An example of mixed reality system 110 is described in more detail with respect to FIG. 3. The mixed reality system 110 detects and identifies a physical environment or the physical object 106 using computer vision. The mixed reality system 110 retrieves virtual content (e.g., 3D object model) based on the identified physical object 106 or physical environment. The mixed reality system 110 renders the virtual object in the display 204. In one example embodiment, the mixed reality system 110 includes a local rendering engine that generates a visualization of virtual content overlaid (e.g., superimposed upon, or otherwise displayed in tandem with) on an image of the physical object 106 captured by the optical sensor 210. A visualization of the virtual content may be manipulated by adjusting a position of the physical object 106 (e.g., its physical location, orientation, or both) relative to the optical sensor 210. Similarly, the visualization of the virtual content may be manipulated by adjusting a pose of the wearable device 108 relative to the physical object 106.

In one example, the low-power processor 220 accesses proximity data from the proximity sensor 224 to detect proximity events (e.g., hands moving) and identify hand gestures. Instead of running the mixed reality system 110 continuously or instead of only running the mixed reality system 110 when requested by the AR application, the low-power hand-tracking system 112 starts running when the wearable device 108 is powered on. The low-power hand-tracking system 112 runs until a hand gesture corresponding to an operation performed by the mixed reality system 110 is identified. The low-power hand-tracking system 112 requests the mixed reality system 110 to launch and perform the operation. Once the mixed reality system 110 is launched, the wearable device 108 switches from operating using the low-power processor 220 to the high-power processor 208.

In one example, the graphical processing unit 216 includes a render engine (not shown) that is configured to render a frame of a 3D model of a virtual object based on the virtual content provided by the AR application and the pose of the wearable device 108. In other words, the graphical processing unit 216 uses the three-dimensional pose of the wearable device 108 to generate frames of virtual content to be presented on the display 304. For example, the graphical processing unit 216 uses the three-dimensional pose to render a frame of the virtual content such that the virtual content is presented at an orientation and position in the display 204 to properly augment the user's reality. As an example, the graphical processing unit 216 may use the three-dimensional pose data to render a frame of virtual content such that, when presented on the display 204, the virtual content overlaps with a physical object in the user's real world environment 102. The graphical processing unit 216 generates updated frames of virtual content based on updated three-dimensional poses of the graphical processing unit 216, which reflect changes in the position and orientation of the user in relation to physical objects in the user's real world environment 102.

The graphical processing unit 216 transfers the rendered frame to the display controller 218. The display controller 218 is positioned as an intermediary between the display controller 218 and the display 204, receives the image data (e.g., rendered frame) from the graphical processing unit 216, and provides the rendered frame to display 204.

The display 204 includes a screen or monitor configured to display images generated by the high-power processor 208. In one example embodiment, the display 204 may be transparent or semi-opaque so that the user 104 can see through the display 204 (in AR use case). In another example embodiment, the display 204 covers the eyes of the user 104 and blocks out the entire field of view of the user 104 (in VR use case). In another example, the display 204 includes a touchscreen display configured to receive a user input via a contact on the touchscreen display.

The storage device 206 stores virtual content 214 and gesture content 222. The virtual content 214 includes, for example, a database of visual references (e.g., images of physical objects) and corresponding experiences (e.g., three-dimensional virtual object models). Other augmentation data that may be stored within the storage device 206 includes augmented reality content items (e.g., corresponding to applying Lenses or augmented reality experiences). An augmented reality content item may be a real-time special effect and sound that may be added to an image or a video. The gesture content 222 includes a library of hand gestures mapped to corresponding operations of the low-power processor 220 or the high-power processor 208.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a wearable device 108 and then displayed on a screen of the wearable device 108 with the modifications. This also includes modifications to stored content, such as video clips in a gallery that may be modified. For example, in a wearable device 108 with access to multiple augmented reality content items, a user can use a single video clip with multiple augmented reality content items to see how the different augmented reality content items will modify the stored clip. For example, multiple augmented reality content items that apply different pseudo random movement models can be applied to the same content by selecting different augmented reality content items for the content. Similarly, real-time video capture may be used with an illustrated modification to show how video images currently being captured by sensors of a wearable device 108 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in the memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the wearable device 108) and perform complex image manipulations locally on the wearable device 108 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the wearable device 108.

In some examples, a computer animation model to transform image data can be used by a system where a user may capture an image or video stream of the user (e.g., a selfie) using a wearable device 108 having a neural network operating as part of an AR application operating on the wearable device 108. The transformation system operating within the AR application determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the wearable device 108 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

Any one or more of the modules described herein may be implemented using hardware (e.g., a Processor of a machine) or a combination of hardware and software. For example, any module described herein may configure a Processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
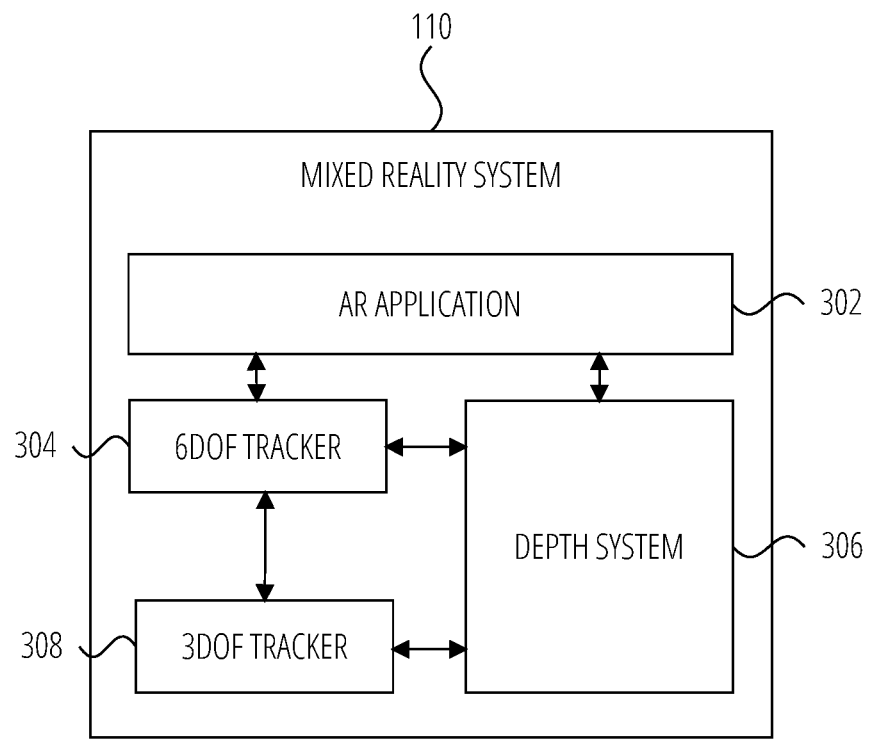
FIG. 3 is a block diagram illustrating a high-power mode system in accordance with one example embodiment.

FIG. 3 illustrates the mixed reality system 110 in accordance with one example embodiment. The mixed reality system 110 includes, for example, an AR application 302, a 6DOF tracker 304, a 3DOF tracker 308, and a depth system 306.

In one example, the mixed reality system 110 communicates with every sensor of sensors 202. In another example, the mixed reality system 110 communicates with specific sensors that are mapped to the mixed reality system 110. The mixed reality system 110 accesses sensor data from the sensors 202.

The AR application 302 detects and identifies a physical environment or the physical object 106 using computer vision. The AR application 302 retrieves virtual content (e.g., 3D object model) based on the identified physical object 106 or physical environment and renders the virtual object in the display 204. In one example embodiment, the AR application 302 includes a local rendering engine that generates a visualization of virtual content overlaid (e.g., superimposed upon, or otherwise displayed in tandem with) on an image of the physical object 106 captured by the optical sensor 210. A visualization of the virtual content may be manipulated by adjusting a position of the physical object 106 (e.g., its physical location, orientation, or both) relative to the optical sensor 210. Similarly, the visualization of the virtual content may be manipulated by adjusting a pose of the wearable device 108 relative to the physical object 106.

The pose of the wearable device 108 may be determined based on the 6DOF tracker 304/3DOF tracker 308 and the depth system 306. The 3DOF tracker 308 allows the wearable device 108 to track rotational motion. For example, the 3DOF tracker 308 can track whether a user of the wearable device 108 is looking left or right, rotating their head up or down, and pivoting left or right. The wearable device 108 cannot use the 3DOF tracking system to determine whether the user has moved around a scene by moving in the real-world environment 102. The 3DOF tracker 308 uses sensor data from the wearable device 108 such as inertial measurement unit (IMU) sensors. For example, the 3DOF tracker 308 system uses sensor data from sensors such as accelerometers, gyroscopes and magnetometers.

The 6DOF tracker 304 allows the wearable device 108 to track rotational and translational motion. For example, the 6DOF tracker 304 can track whether the user has rotated their head and moved forward or backward, laterally or vertically and up or down. The 6DOF tracker 304 includes a visual odometry system that relies on data acquired from multiple sensors (e.g., depth cameras, inertial sensors). The 6DOF tracker 304 analyzes data from the sensors to accurately determine the pose of the wearable device 108.

In one example, the 6DOF tracker 304 determines a pose (e.g., location, position, orientation) of the wearable device 108 relative to a frame of reference (e.g., real-world environment 102). In one example embodiment, the 6DOF tracker 304 includes a visual odometry system that estimates the pose of the wearable device 108 based on 3D maps of feature points from images captured with the depth system 306 and the inertial sensor data captured with the inertial sensor 212. The AR application 302 accesses image data from the optical sensor 210.

In one example embodiment, the 6DOF tracker 304 computes the position and orientation of the wearable device 108. The wearable device 108 includes one or more optical sensor 210 mounted on a rigid platform (a frame of the wearable device 108) with one or more inertial sensor 212. The optical sensor 210 can be mounted with non-overlapping (distributed aperture) or overlapping (stereo or more) fields-of-view.

In some example embodiments, the 6DOF tracker 304 includes an algorithm that combines inertial information from the inertial sensor 212 and image information from the optical sensor 210 that are coupled to a rigid platform (e.g., wearable device 108) or a rig. In one embodiment, a rig may consist of multiple cameras mounted on a rigid platform with an inertial navigation unit (e.g., inertial sensor 212). A rig may thus have at least one inertial navigation unit and at least one camera.

Figure 4:
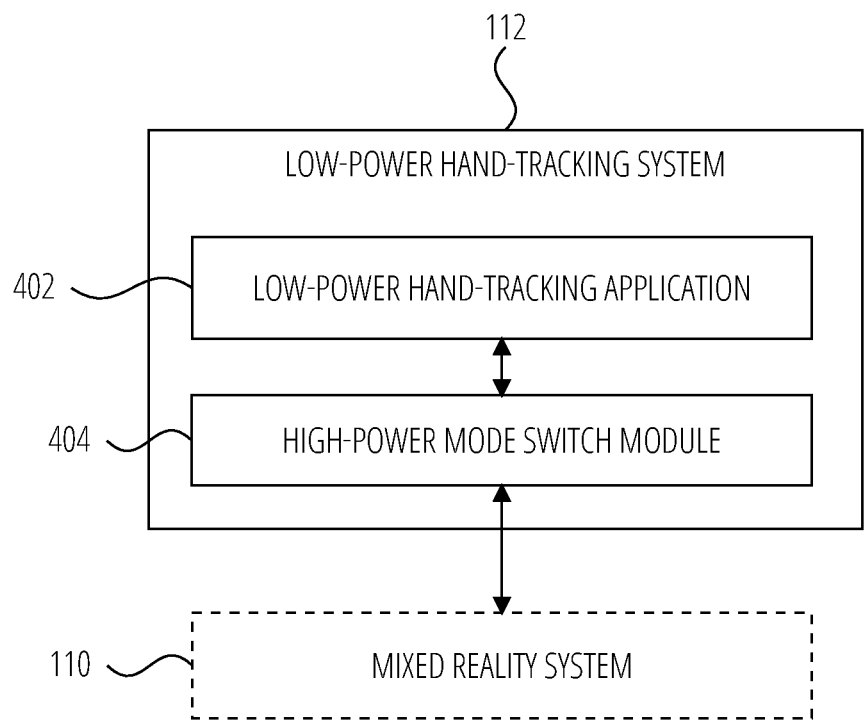
FIG. 4 is a block diagram illustrating a low-power mode system in accordance with one example embodiment.

FIG. 4 is a block diagram illustrating a low-power hand-tracking system 112 in accordance with one example embodiment. The low-power hand-tracking system 112 includes a low-power hand-tracking application 402 and a high-power mode switch module 404. Those of ordinary skills in the art will recognize that other applications may be performed using the low-power hand-tracking system 112 on the low-power processor 220. The applications described in FIG. 4 are for illustrative purposes and are not limiting.

The low-power hand-tracking application 402 operates by default when the wearable device 108 starts or operates after the mixed reality system 110 is idle. In one example, the low-power hand-tracking system 112 detects proximity activity using the proximity sensor 224. Examples of proximity activities include gestures or movement of the hands of the user 104 in front of the wearable device 108. The low-power hand-tracking system 112 operates a hand gesture recognition algorithm (not shown) that is configured to identify a hand gesture based on proximity data from the proximity sensor. The low-power hand-tracking system 112 identifies an operation corresponding to the identified hand gesture. For example, the low-power hand-tracking system 112 identifies a circle hand gesture that is mapped to turning off the wearable device 108. In another example, the low-power hand-tracking system 112 identifies a waving of the hand gesture that is mapped to activating the mixed reality system 110. In one example, the mapped operations can be performed locally using the low-power processor 220 (e.g., MCU) or request that the operation be performed by the high-power processor 208 (SoC) (by providing the request to high-power mode switch module 404).

The low-power hand-tracking application 402 operates on the low-power processor 220 to detect and identify wakeup gestures by using a very low-resolution sensor (4×4) for the proximity sensor 224 for crude gesture recognition. In one example, the MCU is capable of processing higher-resolution mono camera data (using a computer vision camera stream) and running a light version of neural network software such as TensorFlow lite in order to provide higher-end recognition features. In another example embodiment, the low-power hand-tracking application 402 recognizes a limited set of hand commands such as yes, no, cancel, revert, forward, and backward.

The high-power mode switch module 404 receives a request from the low-power hand-tracking application 402 to perform an operation on the mixed reality system 110. The high-power mode switch module 404 activates the other sensors 202 and the mixed reality system 110 to perform to the operation on the mixed reality system 110.

The high-power mode switch module 404 communicates with the mixed reality system 110. In one example, the high-power mode switch module 404 detects that the user 104 has requested to operate the AR application 302 using a preset gesture. In response, the high-power mode switch module 404 signals the mixed reality system 110 to take over. In another example, the wearable device 108 detects a pre-defined trigger event (e.g., hand gestures are not recognized after several tries) and activates the mixed reality system 110 in response to the pre-defined trigger event. The mixed reality system 110 may be configured to identify and recognize a larger set of hand gestures than using the low-power hand-tracking application 402.

In one example embodiment, the wearable device 108, in low-power mode, is programmed to recognize a limited set of gestures (with much smaller NN models and using TOF based sensors (which makes gesture recognition work using changing position and depth) vs recognizing the digits of the hand. For example, the wearable device 108 can detect (in low-power mode) moving a hand right to left or moving hand in a circle.

Figure 5:
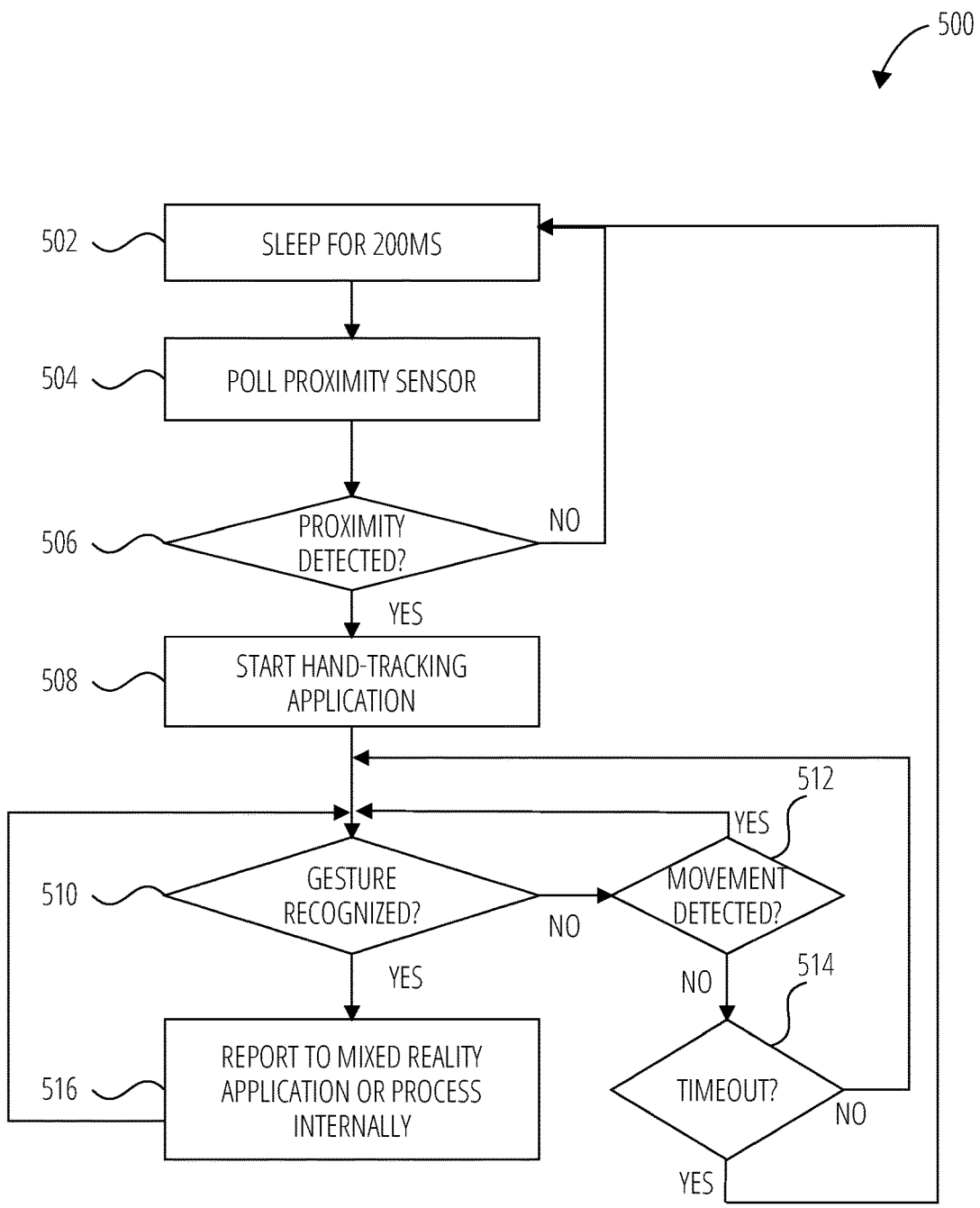
FIG. 5 illustrates a method for operating an AR device at a low-power mode in accordance with one example embodiment.

FIG. 5 is a flowchart illustrating a method 500 in accordance with one example embodiment. Operations of the method 500 may be performed by the low-power hand-tracking system 112. In one example, the method 500 can be operated with the low-power processor 220.

At block 502, the low-power hand-tracking system 112 operates in an IDLE state. At block 504, the low-power hand-tracking system 112 polls (one or more) proximity sensor 224 at a rate of, for example, once in 200 ms until a proximity event is detected by the proximity sensor 224.

At decision block 506, the low-power hand-tracking system 112 determines whether a proximity event is detected based on the proximity data from the proximity sensor 224. When a proximity event is detected, the low-power hand-tracking system 112 activates the low-power hand-tracking application 402 and attempts to recognize the gesture at block 508.

The low-power hand-tracking application 402 stops operating when one of the following conditions is met: (1) a gesture has been detected with a certain minimum confidence level, (2) a gesture has been detected but not recognized, or (3) no proximity activity has been detected for a certain timeout.

The low-power hand-tracking application 402 recognizes the hand gesture, the low-power hand-tracking application 402 will perform a configured action (e.g., wake up main SoC) at block 516. If the low-power hand-tracking application 402 detects a gesture but does not recognize it, the low-power hand-tracking application 402 returns to block 508 to continue detection. If the low-power hand-tracking application 402 does not detect any proximity activity at decision block 512, the low-power hand-tracking application 402 goes back to IDLE state at block 502 after a timeout period has elapsed at decision block 514.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 6:
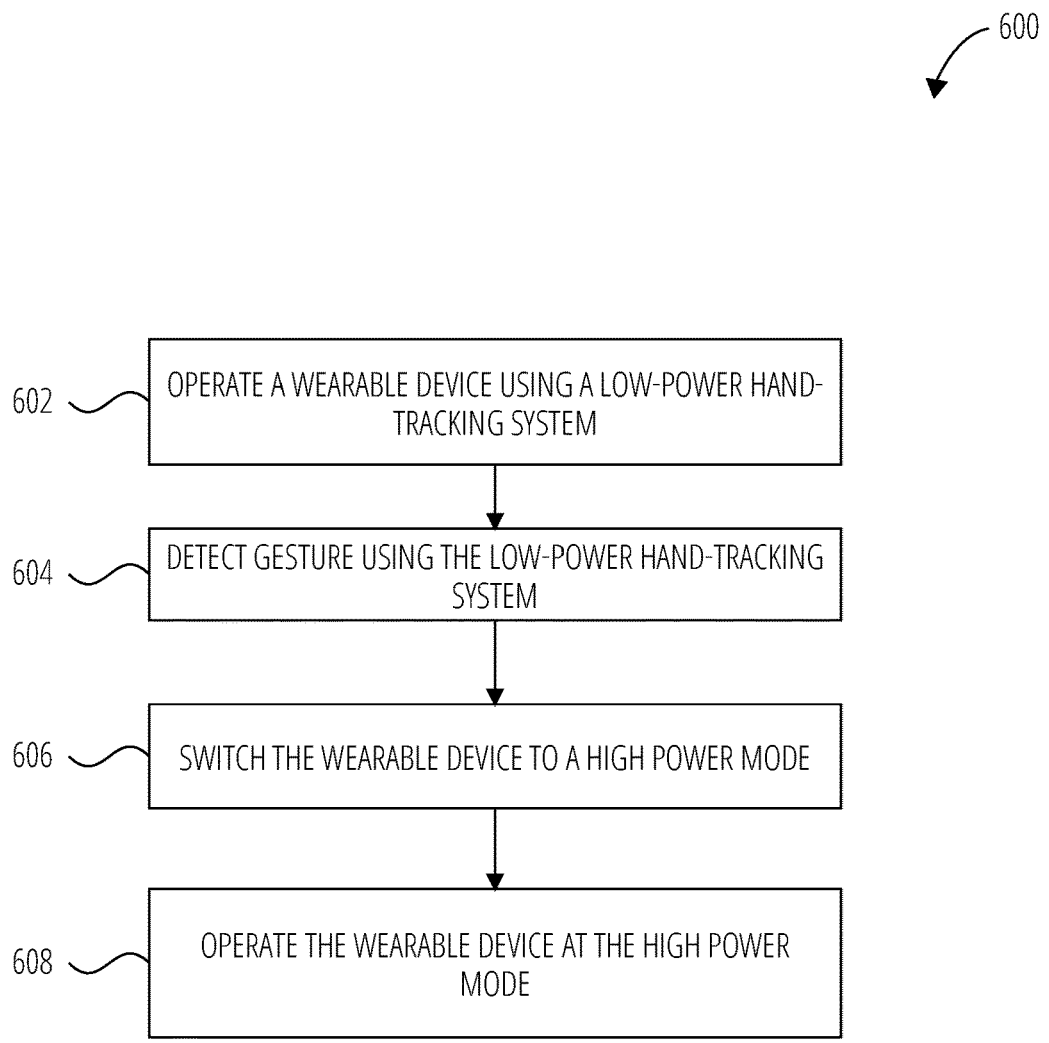
FIG. 6 illustrates a method for operating an AR device at a low-power mode in accordance with one example embodiment.

FIG. 6 is a flowchart illustrating a method 600 in accordance with one example embodiment. Operations of the method 600 may be performed by the low-power hand-tracking system 112. In one example, the method 600 can be operated with the high-power processor 208, the low-power processor 220, or any combination thereof.

In block 602, the low-power hand-tracking system 112 operates the wearable device 108 using a low-power processor 220. In block 604, the low-power hand-tracking system 112 detects a hand gesture using the low-power processor 220. In block 606, the low-power hand-tracking system 112 switches the wearable device 108 to operate with the high-power processor 208. In block 608, the high-power processor 208 operates the wearable device.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 7:
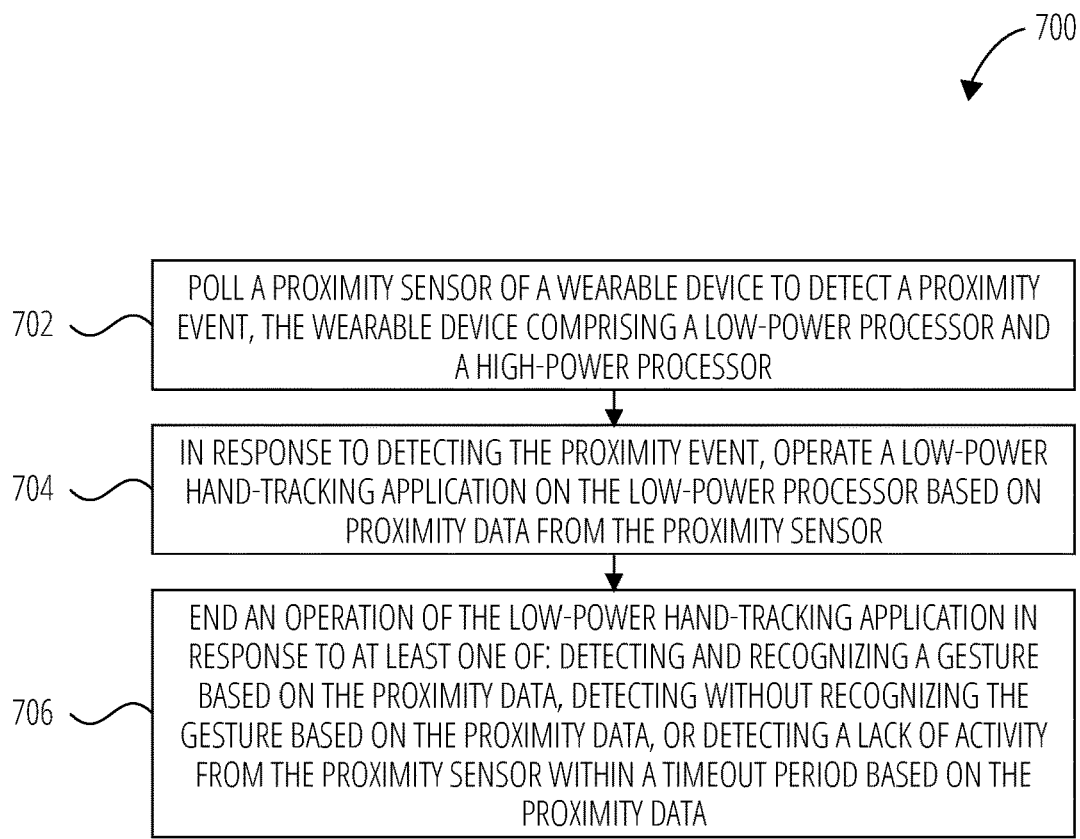
FIG. 7 illustrates a routine in accordance with one example embodiment.

FIG. 7 illustrates a routine 700 in accordance with one embodiment. In block 702, routine 700 polls a proximity sensor of a wearable device to detect a proximity event, the wearable device comprising a low-power processor and a high-power processor. In block 704, routine 700 in response to detecting the proximity event, operates a low-power hand-tracking application on the low-power processor based on proximity data from the proximity sensor. In block 706, routine 700 ends an operation of the low-power hand-tracking application in response to at least one of: detecting and recognizing a gesture based on the proximity data, detecting without recognizing the gesture based on the proximity data, or detecting a lack of activity from the proximity sensor within a timeout period based on the proximity data.

Figure 8:
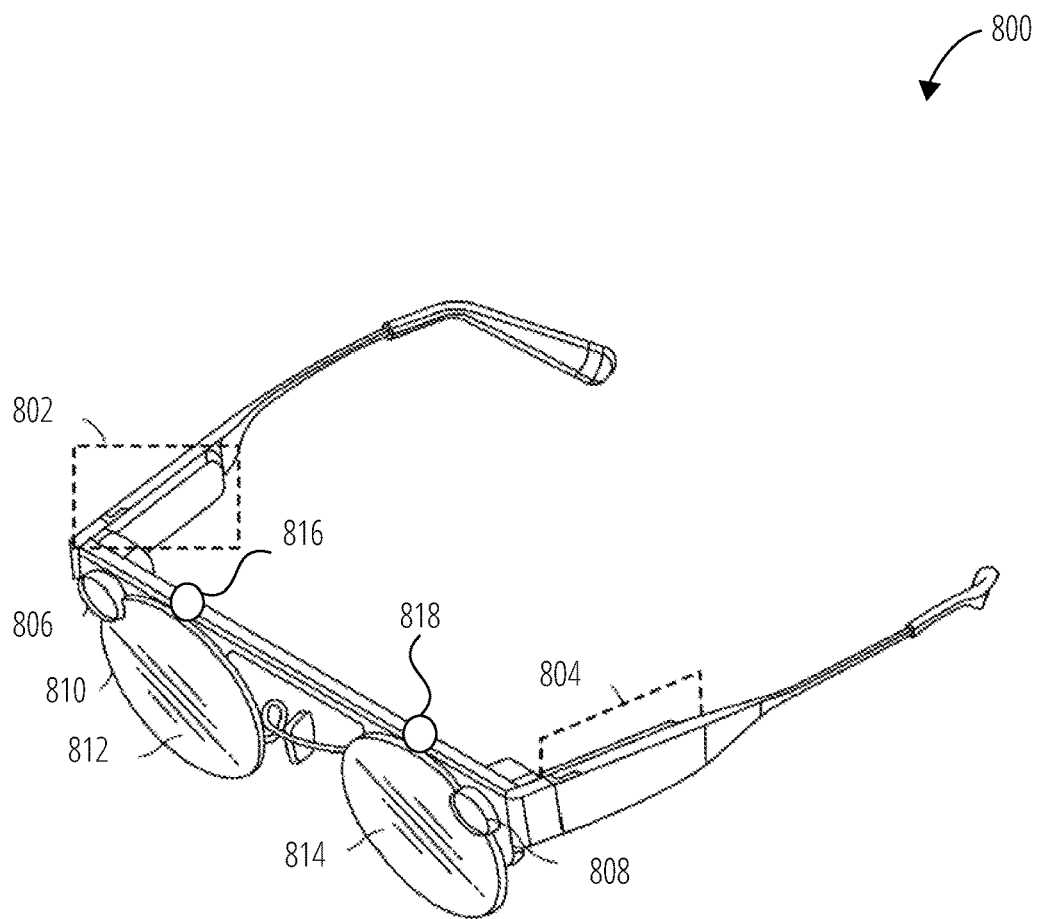
FIG. 8 illustrates a head-wearable apparatus 800, according to one example embodiment

FIG. 8 illustrates a head-wearable apparatus 800, according to one example embodiment. FIG. 8 illustrates a perspective view of the head-wearable apparatus 800 according to one example embodiment. In some examples, the wearable device 108 may be the head-wearable apparatus 800.

In FIG. 8, the head-wearable apparatus 800 is a pair of eyeglasses. In some embodiments, the head-wearable apparatus 800 can be sunglasses or goggles. Some embodiments can include one or more wearable devices, such as a pendant with an integrated camera that is integrated with, in communication with, or coupled to, the head-wearable apparatus 800 or a wearable device 108. Any desired wearable device may be used in conjunction with the embodiments of the present disclosure, such as a watch, a headset, a wristband, earbuds, clothing (such as a hat or jacket with integrated electronics), a clip-on electronic device, or any other wearable devices. It is understood that, while not shown, one or more portions of the system included in the head-wearable apparatus 800 can be included in a wearable device 108 that can be used in conjunction with the head-wearable apparatus 800.

In FIG. 8, the head-wearable apparatus 800 is a pair of eyeglasses that includes a frame 810 that includes eye wires (or rims) that are coupled to two stems (or temples), respectively, via hinges and/or end pieces. The eye wires of the frame 810 carry or hold a pair of lenses (e.g., lens 812 and lens 814). The frame 810 includes a first (e.g., right) side that is coupled to the first stem and a second (e.g., left) side that is coupled to the second stem. The first side is opposite the second side of the frame 810.

The head-wearable apparatus 800 further includes camera lenses (e.g., camera lens 806, camera lens 808) and one or more proximity sensors (proximity sensor 816, proximity sensor 818). The camera lens 806 and camera lens 808 may be a perspective camera lens or a non-perspective camera lens. A non-perspective camera lens may be, for example, a fisheye lens, a wide-angle lens, an omnidirectional lens, etc. The image sensor captures digital video through the camera lens 806 and camera lens 808. The images may also be still image frames or a video including a plurality of still image frames. The camera module can be coupled to the frame 810. As shown in FIG. 8, the frame 810 is coupled to the camera lens 806 and camera lens 808 such that the camera lenses (e.g., camera lens 806, camera lens 808) face forward. The camera lens 806 and camera lens 808 can be perpendicular to the lens 812 and lens 814. The camera module can include dual-front facing cameras that are separated by the width of the frame 810 or the width of the head of the user of the head-wearable apparatus 800.

In FIG. 8, the two stems (or temples) are respectively coupled to microphone housing 802 and microphone housing 804. The first and second stems are coupled to opposite sides of a frame 810 of the head-wearable apparatus 800. The first stem is coupled to the first microphone housing 802 and the second stem is coupled to the second microphone housing 804. The microphone housing 802 and microphone housing 804 can be coupled to the stems between the locations of the frame 810 and the temple tips. The microphone housing 802 and microphone housing 804 can be located on either side of the user's temples when the user is wearing the head-wearable apparatus 800.

As shown in FIG. 8, the microphone housing 802 and microphone housing 804 encase a plurality of microphones (not shown). The microphones are air interface sound pickup devices that convert sound into an electrical signal. More specifically, the microphones are transducers that convert acoustic pressure into electrical signals (e.g., acoustic signals). Microphones can be digital or analog microelectromechanical systems (MEMS) microphones. The acoustic signals generated by the microphones can be pulse density modulation (PDM) signals.

System with Head-Wearable Apparatus

Figure 9:
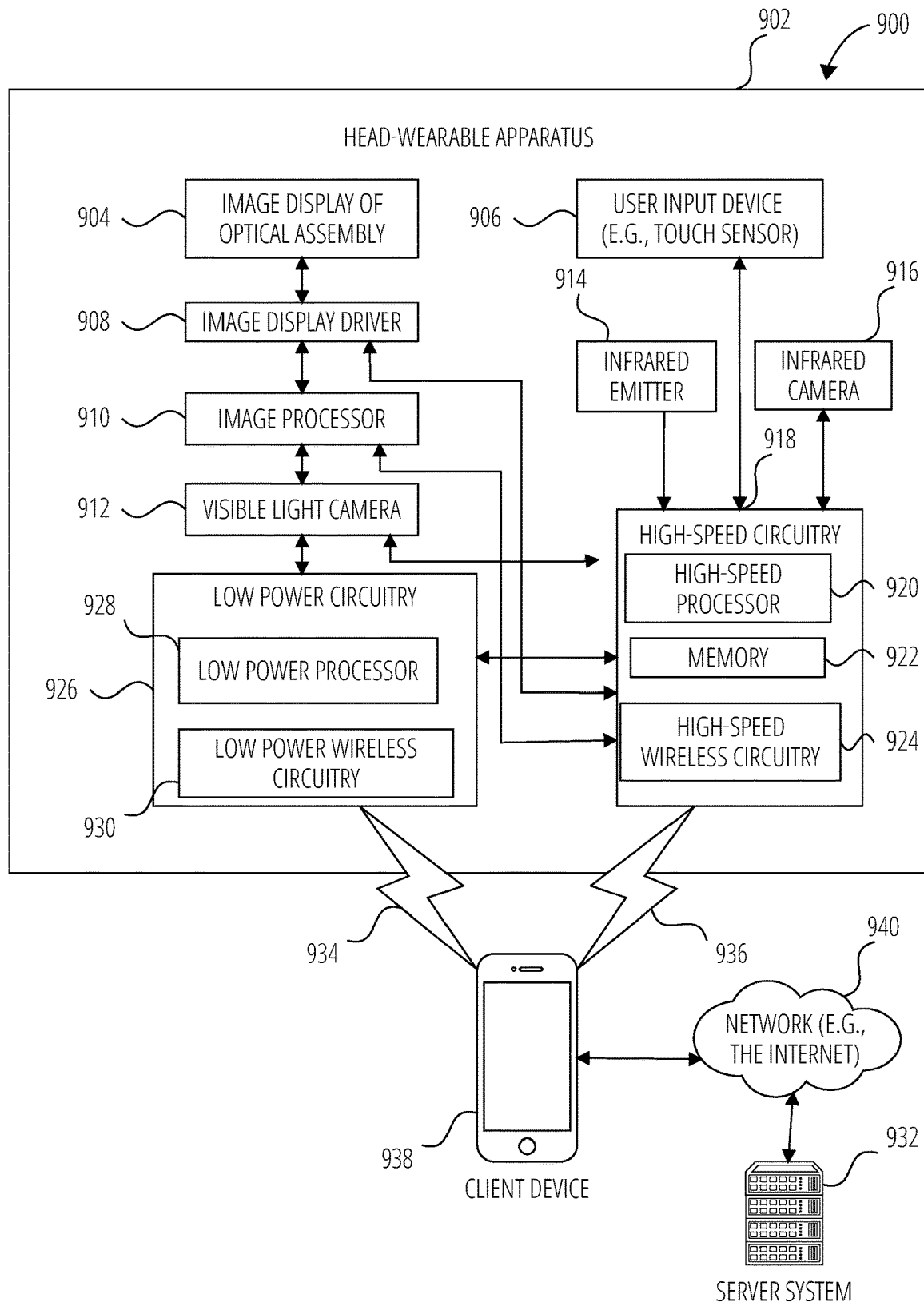
FIG. 9 illustrates a network environment in which a head-wearable device can be implemented according to one example embodiment.

FIG. 9 illustrates a network environment 900 in which the head-wearable apparatus 902 can be implemented according to one example embodiment. FIG. 9 is a high-level functional block diagram of an example head-wearable apparatus 902 communicatively coupled a mobile client device 938 and a server system 932 via various network 940.

Head-wearable apparatus 902 includes a camera, such as at least one of visible light camera 912, infrared emitter 914 and infrared camera 916. The client device 938 can be capable of connecting with head-wearable apparatus 902 using both a communication 934 and a communication 936. Client device 938 is connected to server system 932 and network 940. The network 940 may include any combination of wired and wireless connections.

The head-wearable apparatus 902 further includes two image displays of the image display of optical assembly 904. The two include one associated with the left lateral side and one associated with the right lateral side of the head-wearable apparatus 902. The head-wearable apparatus 902 also includes image display driver 908, image processor 910, low-power low power circuitry 926, and high-speed circuitry 918. The image display of optical assembly 904 are for presenting images and videos, including an image that can include a graphical user interface to a user of the head-wearable apparatus 902.

The image display driver 908 commands and controls the image display of the image display of optical assembly 904. The image display driver 908 may deliver image data directly to the image display of the image display of optical assembly 904 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 902 includes a frame and stems (or temples) extending from a lateral side of the frame. The head-wearable apparatus 902 further includes a user input device 906 (e.g., touch sensor or push button) including an input surface on the head-wearable apparatus 902. The user input device 906 (e.g., touch sensor or push button) is to receive from the user an input selection to manipulate the graphical user interface of the presented image.

The components shown in FIG. 9 for the head-wearable apparatus 902 are located on one or more circuit boards, for example a PCB or flexible PCB, in the rims or temples. Alternatively, or additionally, the depicted components can be located in the chunks, frames, hinges, or bridge of the head-wearable apparatus 902. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 902 includes a memory 922 which stores instructions to perform a subset or all of the functions described herein. memory 922 can also include storage device.

As shown in FIG. 9, high-speed circuitry 918 includes high-speed processor 920, memory 922, and high-speed wireless circuitry 924. In the example, the image display driver 908 is coupled to the high-speed circuitry 918 and operated by the high-speed processor 920 in order to drive the left and right image displays of the image display of optical assembly 904. high-speed processor 920 may be any processor capable of managing high-speed communications and operation of any general computing system needed for head-wearable apparatus 902. The high-speed processor 920 includes processing resources needed for managing high-speed data transfers on communication 936 to a wireless local area network (WLAN) using high-speed wireless circuitry 924. In certain examples, the high-speed processor 920 executes an operating system such as a LINUX operating system or other such operating system of the head-wearable apparatus 902 and the operating system is stored in memory 922 for execution. In addition to any other responsibilities, the high-speed processor 920 executing a software architecture for the head-wearable apparatus 902 is used to manage data transfers with high-speed wireless circuitry 924. In certain examples, high-speed wireless circuitry 924 is configured to implement Institute of Electrical and Electronic Engineers (IEEE) 902.11 communication standards, also referred to herein as Wi-Fi. In other examples, other high-speed communications standards may be implemented by high-speed wireless circuitry 924.

The low power wireless circuitry 930 and the high-speed wireless circuitry 924 of the head-wearable apparatus 902 can include short range transceivers (Bluetooth™) and wireless wide, local, or wide area network transceivers (e.g., cellular or WiFi). The client device 938, including the transceivers communicating via the communication 934 and communication 936, may be implemented using details of the architecture of the head-wearable apparatus 902, as can other elements of network 940.

The memory 922 includes any storage device capable of storing various data and applications, including, among other things, camera data generated by the left and right, infrared camera 916, and the image processor 910, as well as images generated for display by the image display driver 908 on the image displays of the image display of optical assembly 904. While memory 922 is shown as integrated with high-speed circuitry 918, in other examples, memory 922 may be an independent standalone element of the head-wearable apparatus 902. In certain such examples, electrical routing lines may provide a connection through a chip that includes the high-speed processor 920 from the image processor 910 or low power processor 928 to the memory 922. In other examples, the high-speed processor 920 may manage addressing of memory 922 such that the low power processor 928 will boot the high-speed processor 920 any time that a read or write operation involving memory 922 is needed.

As shown in FIG. 9, the low power processor 928 or high-speed processor 920 of the head-wearable apparatus 902 can be coupled to the camera (visible light camera 912; infrared emitter 914, or infrared camera 916), the image display driver 908, the user input device 906 (e.g., touch sensor or push button), and the memory 922.

The head-wearable apparatus 902 is connected with a host computer. For example, the head-wearable apparatus 902 is paired with the client device 938 via the communication 936 or connected to the server system 932 via the network 940. server system 932 may be one or more computing devices as part of a service or network computing system, for example, that include a processor, a memory, and network communication interface to communicate over the network 940 with the client device 938 and head-wearable apparatus 902.

The client device 938 includes a processor and a network communication interface coupled to the processor. The network communication interface allows for communication over the network 940, communication 934 or communication 936. client device 938 can further store at least portions of the instructions for generating a binaural audio content in the client device 938's memory to implement the functionality described herein.

Output components of the head-wearable apparatus 902 include visual components, such as a display such as a liquid crystal display (LCD), a plasma display panel (PDP), a light emitting diode (LED) display, a projector, or a waveguide. The image displays of the optical assembly are driven by the image display driver 908. The output components of the head-wearable apparatus 902 further include acoustic components (e.g., speakers), haptic components (e.g., a vibratory motor), other signal generators, and so forth. The input components of the head-wearable apparatus 902, the client device 938, and server system 932, such as the user input device 906, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 902 may optionally include additional peripheral device elements. Such peripheral device elements may include biometric sensors, additional sensors, or display elements integrated with head-wearable apparatus 902. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 936 from the client device 938 via the low power wireless circuitry 930 or high-speed wireless circuitry 924.

Figure 10:
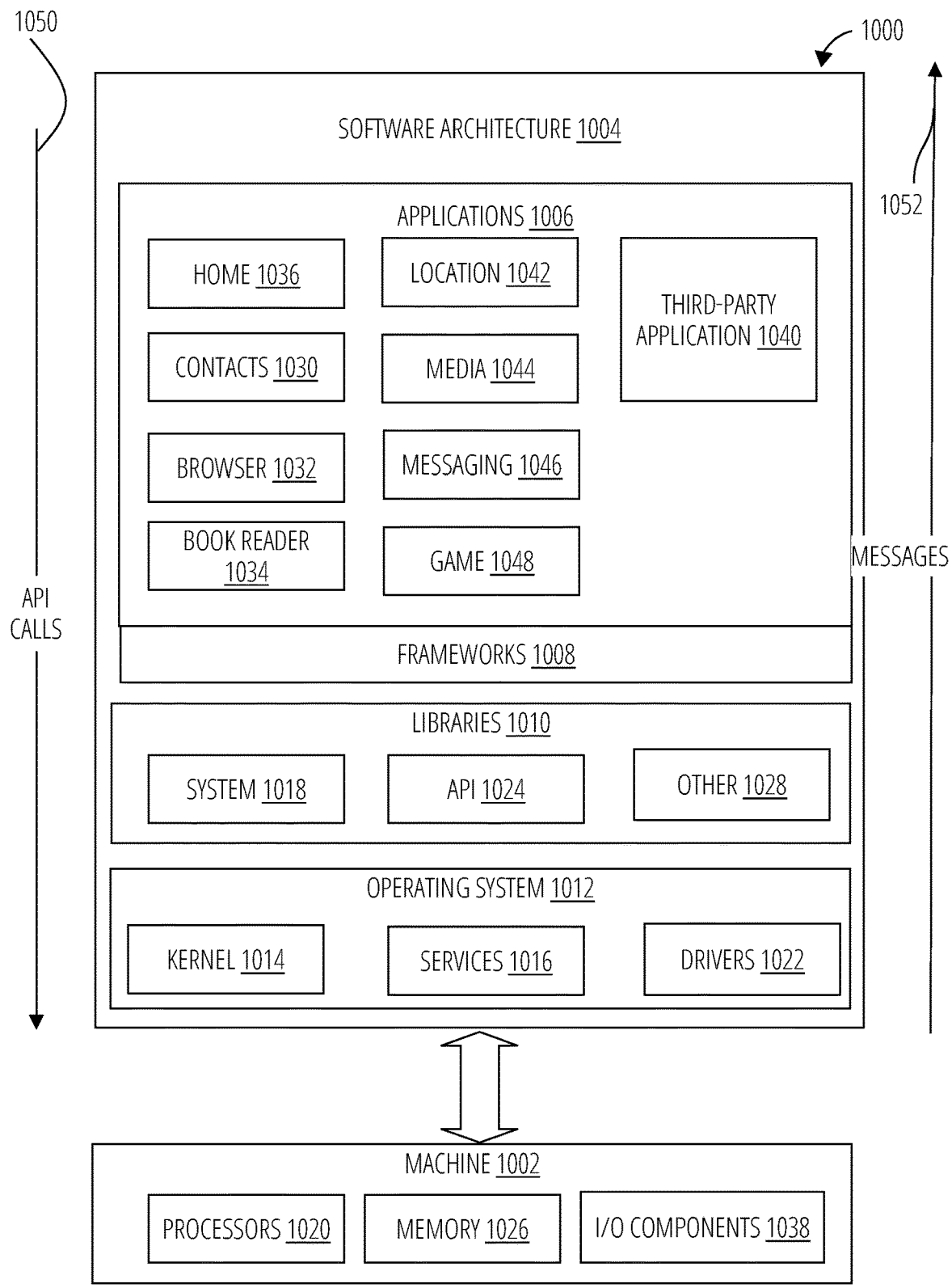
FIG. 10 is block diagram showing a software architecture within which the present disclosure may be implemented, according to an example embodiment.

FIG. 10 is a block diagram 1000 illustrating a software architecture 1004, which can be installed on any one or more of the devices described herein. The software architecture 1004 is supported by hardware such as a machine 1002 that includes Processors 1020, memory 1026, and I/O Components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, Processor management (e.g., scheduling), Component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FED drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example embodiment, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Figure 11:
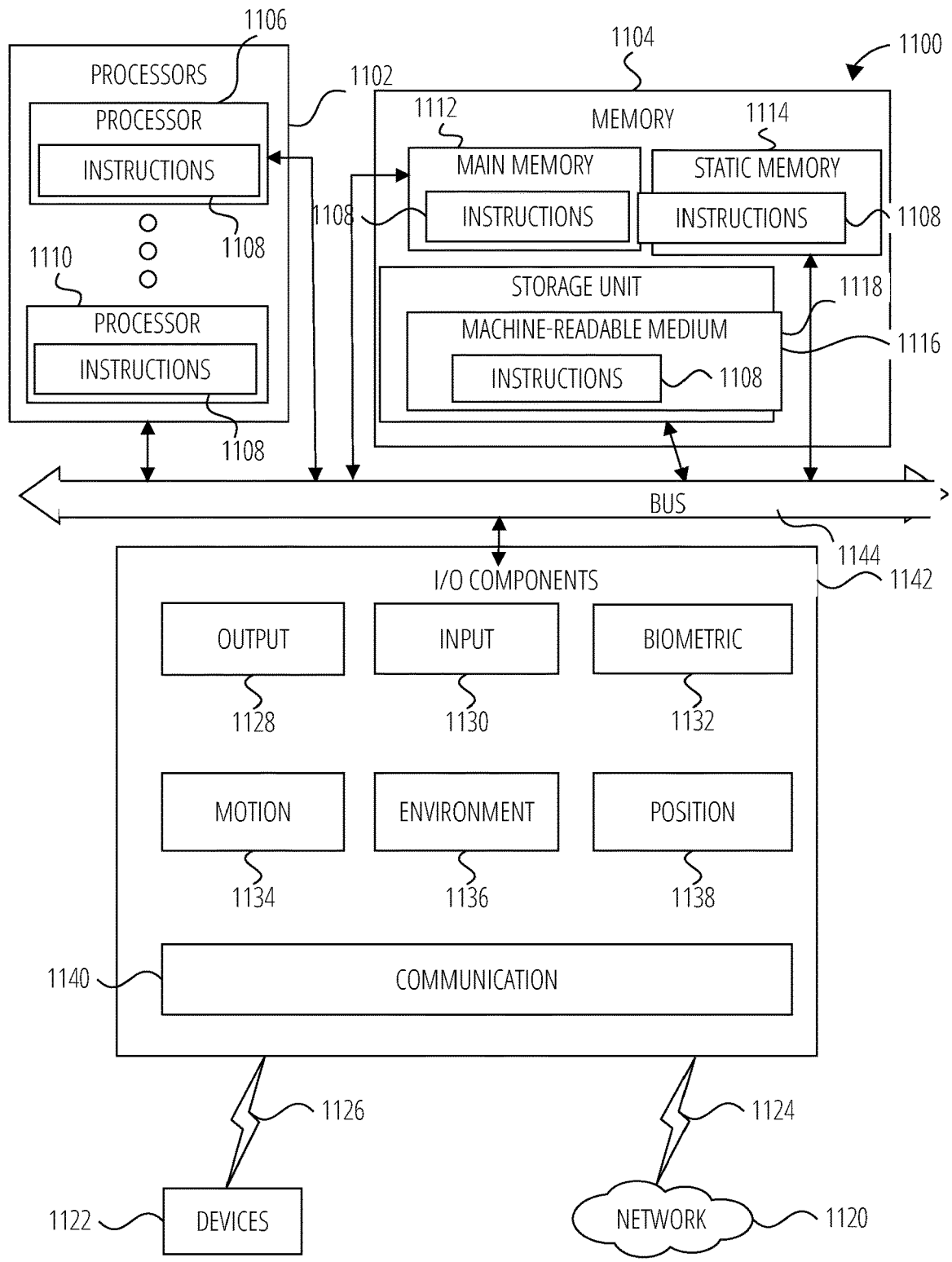
FIG. 11 is a diagrammatic representation of a machine in the form of a computer system within which a set of instructions may be executed for causing the machine to perform any one or more of the methodologies discussed herein, according to one example embodiment.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein.

The machine 1100 may include Processors 1102, memory 1104, and I/O Components 1142, which may be configured to communicate with each other via a bus 1144. In an example embodiment, the Processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1106 and a Processor 1110 that execute the instructions 1108. The term "Processor" is intended to include multi-core Processors that may comprise two or more independent Processors (sometimes referred to as "cores") that may execute instructions contemporaneously. Although FIG. 11 shows multiple Processors 1102, the machine 1100 may include a single Processor with a single core, a single Processor with multiple cores (e.g., a multi-core Processor), multiple Processors with a single core, multiple Processors with multiples cores, or any combination thereof.

The memory 1104 includes a main memory 1112, a static memory 1114, and a storage unit 1116, both accessible to the Processors 1102 via the bus 1144. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the Processors 1102 (e.g., within the Processor's cache memory), or any suitable combination thereof, during execution thereof by the machine 1100.

The I/O Components 1142 may include a wide variety of Components to receive input, provide output, produce output, transmit information, exchange information, capture measurements, and so on. The specific I/O Components 1142 that are included in a particular machine will depend on the type of machine. For example, portable machines such as mobile phones may include a touch input device or other such input mechanisms, while a headless server machine will likely not include such a touch input device. It will be appreciated that the I/O Components 1142 may include many other Components that are not shown in FIG. 11. In various example embodiments, the I/O Components 1142 may include output Components 1128 and input Components 1130. The output Components 1128 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1130 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1142 may include biometric Components 1132, motion Components 1134, environmental Components 1136, or position Components 1138, among a wide array of other Components. For example, the biometric Components 1132 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1134 include acceleration sensor Components (e.g., accelerometer), gravitation sensor Components, rotation sensor Components (e.g., gyroscope), and so forth. The environmental Components 1136 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1138 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1142 further include communication Components 1140 operable to couple the machine 1100 to a network 1120 or devices 1122 via a coupling 1124 and a coupling 1126, respectively. For example, the communication Components 1140 may include a network interface Component or another suitable device to interface with the network 1120. In further examples, the communication Components 1140 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1122 may be another machine or any of a wide variety of peripheral devices (e.g., a peripheral device coupled via a USB).

Moreover, the communication Components 1140 may detect identifiers or include Components operable to detect identifiers. For example, the communication Components 1140 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1140, such as location via Internet Protocol (IP) geolocation, location via Wi-Fi® signal triangulation, location via detecting an NFC beacon signal that may indicate a particular location, and so forth.

The various memories (e.g., memory 1104, main memory 1112, static memory 1114, and/or memory of the Processors 1102) and/or storage unit 1116 may store one or more sets of instructions and data structures (e.g., software) embodying or used by any one or more of the methodologies or functions described herein. These instructions (e.g., the instructions 1108), when executed by Processors 1102, cause various operations to implement the disclosed embodiments.

The instructions 1108 may be transmitted or received over the network 1120, using a transmission medium, via a network interface device (e.g., a network interface Component included in the communication Components 1140) and using any one of a number of well-known transfer protocols (e.g., hypertext transfer protocol (HTTP)). Similarly, the instructions 1108 may be transmitted or received using a transmission medium via the coupling 1126 (e.g., a peer-to-peer coupling) to the devices 1122.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Examples

Example 1 is a method comprising: polling a proximity sensor of a wearable device to detect a proximity event, the wearable device comprising a low-power processor and a high-power processor; in response to detecting the proximity event, operating a low-power hand-tracking application on the low-power processor based on proximity data from the proximity sensor; and ending an operation of the low-power hand-tracking application in response to at least one of: detecting and recognizing a gesture based on the proximity data, detecting without recognizing the gesture based on the proximity data, or detecting a lack of activity from the proximity sensor within a timeout period based on the proximity data.

Example 2 includes the method of example 1, further comprising: generating a level of confidence of the gesture based on a gesture dictionary, using a gesture recognition algorithm operating on the low-power processor; and identifying the gesture in response to the level of confidence exceeding a preset threshold.

Example 3 includes the method of example 2, further comprising: identifying an operation corresponding to the gesture; and requesting one of the low-power processor or the high-power processor to perform the operation.

Example 4 includes the method of example 2, further comprising: identifying an operation of a mixed reality application corresponding to the gesture; and requesting the high-power processor to perform the operation of the mixed reality application.

Example 5 includes the method of example 1, further comprising: in response to ending the operation of the low-power hand-tracking application, returning the wearable device to an idle state that polls the proximity sensor at a regular interval.

Example 6 includes the method of example 1, wherein the proximity sensor comprises a time-of-flight sensor.

Example 7 includes the method of example 1, wherein the low-power processor comprises a microcontroller, wherein the high-power processor comprises a system-on-chip (SoC).

Example 8 includes the method of example 1, wherein the low-power processor is configured to only operate the proximity sensor and the low-power hand-tracking application, wherein the high-power processor is configured to operate all sensors of the wearable device.

Example 9 includes the method of example 1, wherein the low-power hand-tracking application uses a neural network to detect and recognize a hand gesture of a user of the wearable device based on the proximity data, the neural network being configured to recognize a first set of hand gestures, and wherein the high-power processor comprises a high-power hand-tracking application configured to recognize a second set of hand gestures using camera data from a higher resolution camera of the wearable device, the second set of hand gestures being larger than the first set of hand gestures.

Example 10 includes the method of example 1, wherein the wearable device comprises a head-wearable device.

Example 11 is a computing apparatus comprising: a processor; and a memory storing instructions that, when executed by the processor, configure the apparatus to: poll a proximity sensor of a wearable device to detect a proximity event, the wearable device comprising a low-power processor and a high-power processor; in response to detecting the proximity event, operate a low-power hand-tracking application on the low-power processor based on proximity data from the proximity sensor; and end an operation of the low-power hand-tracking application in response to at least one of: detecting and recognizing a gesture based on the proximity data, detecting without recognizing the gesture based on the proximity data, or detecting a lack of activity from the proximity sensor within a timeout period based on the proximity data.

Example 12 includes the computing apparatus of example 11, wherein the instructions further configure the apparatus to: generate a level of confidence of the gesture based on a gesture dictionary, using a gesture recognition algorithm operating on the low-power processor; and identify the gesture in response to the level of confidence exceeding a preset threshold.

Example 13 includes the computing apparatus of example 12, wherein the instructions further configure the apparatus to: identify an operation corresponding to the gesture; and request one of the low-power processor or the high-power processor to perform the operation.

Example 14 includes the computing apparatus of example 12, wherein the instructions further configure the apparatus to: identify an operation of a mixed reality application corresponding to the gesture; and request the high-power processor to perform the operation of the mixed reality application.

Example 15 includes the computing apparatus of example 11, wherein the instructions further configure the apparatus to: in response to ending the operation of the low-power hand-track application, returning the wearable device to an idle state that polls the proximity sensor at a regular interval.

Example 16 includes the computing apparatus of example 11, wherein the proximity sensor comprises a time-of-flight sensor.

Example 17 includes the computing apparatus of example 11, wherein the low-power processor comprises a microcontroller, wherein the high-power processor comprises a system-on-chip (SoC).

Example 18 includes the computing apparatus of example 11, wherein the low-power processor is configured to only operate the proximity sensor and the low-power hand-track application, wherein the high-power processor is configured to operate all sensors of the wearable device.

Example 19 includes the computing apparatus of example 11, wherein the low-power hand-track application uses a neural network to detect and recognize a hand gesture of a user of the wearable device based on the proximity data, the neural network being configured to recognize a first set of hand gestures, and wherein the high-power processor comprises a high-power hand-track application configured to recognize a second set of hand gestures using camera data from a higher resolution camera of the wearable device, the second set of hand gestures being larger than the first set of hand gestures.

Example 20 is a non-transitory computer-readable storage medium, the computer-readable storage medium including instructions that when executed by a computer, cause the computer to: poll a proximity sensor of a wearable device to detect a proximity event, the wearable device comprising a low-power processor and a high-power processor; in response to detecting the proximity event, operate a low-power hand-tracking application on the low-power processor based on proximity data from the proximity sensor; and end an operation of the low-power hand-tracking application in response to at least one of: detecting and recognizing a gesture based on the proximity data, detecting without recognizing the gesture based on the proximity data, or detecting a lack of activity from the proximity sensor within a timeout period based on the proximity data.

Glossary

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both Machine-Storage Media and transmission media. Thus, the terms include both storage devices/media and carrier waves/modulated data signals. The terms "machine-readable medium," "Computer-Readable Medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of Machine-Storage Media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "Machine-Storage Medium," "device-storage medium," "computer-storage medium" mean the same thing and may be used interchangeably in this disclosure. The terms "Machine-Storage Media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:
1. A method comprising:
polling a proximity sensor of a wearable device to detect a proximity event, the wearable device comprising a low-power processor and a high-power processor;

in response to detecting the proximity event, performing a gesture detection and recognition routine using a low-power gesture recognition application executed on the low-power processor based on proximity data from the proximity sensor;

determining that the gesture detection and recognition routine executed on the low-power processor fails to recognize a gesture of a user of the wearable device; and in response to determining that the gesture detection and recognition routine executed on the low-power processor fails to recognize the gesture activating a high-power gesture recognition application executed on the high-power processor.

2. The method of claim 1, further comprising:
generating a level of confidence of the gesture based on a gesture dictionary, using a gesture recognition algorithm operating on the low-power processor; and
identifying the gesture in response to the level of confidence exceeding a preset threshold.

3. The method of claim 2, further comprising:
identifying an operation corresponding to the gesture; and
requesting one of the low-power processor or the high-power processor to perform the operation.

4. The method of claim 2, further comprising:
identifying an operation of a mixed reality application corresponding to the gesture; and
requesting the high-power processor to perform the operation of the mixed reality application.

5. The method of claim 1, further comprising:
returning the wearable device to an idle state that polls the proximity sensor at a regular interval after the high-power gesture recognition application recognizes the gesture.

6. The method of claim 1, further comprising:
identifying a preset number of gesture recognition tries corresponding to the low-power gesture recognition application, the preset number of gesture recognition tries comprising at least two tries;
determining that the gesture detection and recognition routine executed on the low-power processor fails to recognize the gesture after a number of tries exceeding the preset number of gesture recognition tries,
wherein activating the high-power gesture recognition application executed on the high-power processor is in response to determining that the gesture detection and recognition routine executed on the low-power processor fails to recognize the gesture after the number of tries exceeding the preset number of gesture recognition tries.

7. The method of claim 1, wherein the low-power processor comprises a microcontroller, wherein the high-power processor comprises a system-on-chip (SoC), wherein the proximity sensor comprises a time-of-flight sensor.

8. The method of claim 1, wherein the low-power processor is configured to only operate the proximity sensor and the low-power gesture recognition application, wherein the high-power processor is configured to operate all sensors of the wearable device.

9. The method of claim 1, wherein the low-power hand tracking gesture recognition application uses a neural network to detect and recognize a hand gesture of a user of the wearable device based on the proximity data, the neural network being configured to recognize a first set of hand gestures, and
wherein the high-power processor comprises a high-power hand-tracking application configured to recognize a second set of hand gestures using camera data from a higher resolution camera of the wearable device, the second set of hand gestures being larger than the first set of hand gestures.

10. The method of claim 1, wherein the wearable device comprises a head-wearable device.

11. A computing apparatus comprising:
a processor; and
a memory storing instructions that, when executed by the processor, configure the apparatus to:
poll a proximity sensor of a wearable device to detect a proximity event, the wearable device comprising a low-power processor and a high-power processor;
in response to detecting the proximity event, perform a gesture detection and recognition routine using a low-power gesture recognition application executed on the low-power processor based on proximity data from the proximity sensor;
determine that the gesture detection and recognition routine executed on the low-power processor fails to recognize a gesture of a user of the wearable device; and
in response to determining that the gesture detection and recognition routine executed on the low-power processor fails to recognize the gesture activate a high-power gesture recognition application executed on the high-power processor.

12. The computing apparatus of claim 11, wherein the instructions further configure the apparatus to:
generate a level of confidence of the gesture based on a gesture dictionary, using a gesture recognition algorithm operating on the low-power processor; and
identify the gesture in response to the level of confidence exceeding a preset threshold.

13. The computing apparatus of claim 12, wherein the instructions further configure the apparatus to:
identify an operation corresponding to the gesture; and
request one of the low-power processor or the high-power processor to perform the operation.

14. The computing apparatus of claim 12, wherein the instructions further configure the apparatus to:
identify an operation of a mixed reality application corresponding to the gesture; and
request the high-power processor to perform the operation of the mixed reality application.

15. The computing apparatus of claim 11, wherein the instructions further configure the apparatus to:
returning the wearable device to an idle state that polls the proximity sensor at a regular interval after the high-power gesture recognition application recognizes the gesture.

16. The computing apparatus of claim 11, wherein the instructions further configure the apparatus to:
identify a preset number of gesture recognition tries corresponding to the low-power gesture recognition application, the preset number of gesture recognition tries comprising at least two tries;
determine that the gesture detection and recognition routine executed on the low-power processor fails to recognize the gesture after a number of tries exceeding the preset number of gesture recognition tries,
wherein activating the high-power gesture recognition application executed on the high-power processor is in response to determining that the gesture detection and recognition routine executed on the low-power processor fails to recognize the gesture after the number of tries exceeding the preset number of gesture recognition tries.

17. The computing apparatus of claim 11, wherein the low-power processor comprises a microcontroller, wherein the high-power processor comprises a system-on-chip (SoC), wherein the proximity sensor comprises a time-of-flight sensor.

18. The computing apparatus of claim 11, wherein the low-power processor is configured to only operate the proximity sensor and the low-power gesture recognition application, wherein the high-power processor is configured to operate all sensors of the wearable device.

19. The computing apparatus of claim 11, wherein the low-power gesture recognition application uses a neural network to detect and recognize a hand gesture of a user of the wearable device based on the proximity data, the neural network being configured to recognize a first set of hand gestures, and
   wherein the high-power processor comprises a high-power hand-track application configured to recognize a second set of hand gestures using camera data from a higher resolution camera of the wearable device, the second set of hand gestures being larger than the first set of hand gestures.

20. A non-transitory computer-readable storage medium, the computer-readable storage medium including instructions that when executed by a computer, cause the computer to:
   poll a proximity sensor of a wearable device to detect a proximity event, the wearable device comprising a low-power processor and a high-power processor;
   in response to detecting the proximity event, perform a gesture detection and recognition routine using a low-power gesture recognition application executed on the low-power processor based on proximity data from the proximity sensor by operating a low power hand tracking application on the low power processor;
   determine that the gesture detection and recognition routine executed on the low-power processor fails to recognize a gesture of a user of the wearable device; and
   in response to determining that the gesture detection and recognition routine executed on the low-power processor fails to recognize the gesture activate a high-power gesture recognition application executed on the high-power processor.

* * * * *

UNITED STATES PATENT AND TRADEMARK OFFICE
CERTIFICATE OF CORRECTION

PATENT NO. : 12,204,693 B2
APPLICATION NO. : 17/851465
DATED : January 21, 2025
INVENTOR(S) : Feinman et al.

Page 1 of 1

It is certified that error appears in the above-identified patent and that said Letters Patent is hereby corrected as shown below:

In the Claims

In Column 29, Lines 60-61, in Claim 9, after "low-power", delete "hand tracking"

In Column 32, Lines 12-13, in Claim 20, delete "sensor by operating a low power hand tracking application on the low power processor;" and insert --sensor;-- therefor Signed and Sealed this
Eighth Day of April, 2025

Coke Morgan Stewart
*Acting Director of the United States Patent and Trademark Office*